(12) United States Patent
Guarda et al.

(10) Patent No.: US 10,968,312 B2
(45) Date of Patent: Apr. 6, 2021

(54) METHOD FOR MANUFACTURING POLYALKOXYLATED POLYMERS

(71) Applicant: SOLVAY SPECIALTY POLYMERS ITALY S.P.A., Bollate (IT)

(72) Inventors: Pier Antonio Guarda, Arese (IT); Gianfranco Spataro, Lissone (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 24 days.

(21) Appl. No.: 16/319,192

(22) PCT Filed: Jul. 19, 2017

(86) PCT No.: PCT/EP2017/068190
§ 371 (c)(1),
(2) Date: Jan. 18, 2019

(87) PCT Pub. No.: WO2018/015417
PCT Pub. Date: Jan. 25, 2018

(65) Prior Publication Data
US 2019/0241704 A1   Aug. 8, 2019

(30) Foreign Application Priority Data
Jul. 20, 2016  (EP) .................... 16180395

(51) Int. Cl.
*C08G 65/26* (2006.01)
*C08G 65/331* (2006.01)
*C08G 65/00* (2006.01)
*C08L 71/02* (2006.01)

(52) U.S. Cl.
CPC ....... *C08G 65/2639* (2013.01); *C08G 65/007* (2013.01); *C08G 65/266* (2013.01); *C08G 65/2609* (2013.01); *C08G 65/2654* (2013.01); *C08G 65/331* (2013.01); *C08L 71/02* (2013.01); *C08G 2650/48* (2013.01); *C08L 2205/025* (2013.01)

(58) Field of Classification Search
CPC ............ C08G 65/2639; C08G 65/2609; C08G 65/2654; C08G 65/266; C08G 65/331; C08G 65/007; C08G 2650/48; C08L 71/02; C08L 2205/025
See application file for complete search history.

(56) References Cited

U.S. PATENT DOCUMENTS

| | | |
|---|---|---|
| 3,442,942 A | 5/1969 | Sianesi et al. |
| 3,665,041 A | 5/1972 | Sianesi et al. |
| 3,715,378 A | 2/1973 | Sianesi et al. |
| 3,766,251 A | 10/1973 | Caporiccio et al. |
| 3,847,978 A | 11/1974 | Sianesi et al. |
| 4,490,561 A | 12/1984 | Yang et al. |
| 4,647,413 A | 3/1987 | Savu |
| 4,983,778 A | 1/1991 | Ploog |
| 5,258,110 A | 11/1993 | Sianesi et al. |
| 5,777,291 A | 7/1998 | Marchionni et al. |
| 6,509,509 B2 | 1/2003 | Tonelli et al. |
| 6,573,411 B2 | 6/2003 | Russo et al. |
| 7,132,574 B2 | 11/2006 | Picozzi et al. |
| 8,039,677 B2 | 10/2011 | Peng et al. |

FOREIGN PATENT DOCUMENTS

| | | |
|---|---|---|
| EP | 0151877 A2 | 8/1985 |
| EP | 0228121 A1 | 7/1987 |
| WO | 9535272 A1 | 12/1995 |
| WO | 9628407 A2 | 9/1996 |
| WO | 2008122639 A1 | 10/2008 |
| WO | 2009073641 A1 | 6/2009 |
| WO | 2010127230 A2 | 11/2010 |
| WO | 2012139070 A1 | 10/2012 |
| WO | 2014090649 A1 | 6/2014 |

*Primary Examiner* — Shane Fang
(74) *Attorney, Agent, or Firm* — Osha Bergman Watanabe & Burton LLP

(57) ABSTRACT

The present invention relates to a method for the manufacture of polyalkoxylated polymers.

20 Claims, No Drawings

METHOD FOR MANUFACTURING POLYALKOXYLATED POLYMERS

CROSS-REFERENCE TO RELATED APPLICATIONS

This application is a U.S. national stage entry under 35 U.S.C. 071 of International Application No. PCT/EP2017/068190 filed Jul. 19, 2017, which claims priority to European application No. 16180395.2, filed on Jul. 20, 2016. The entire contents of these applications are explicitly incorporated herein by this reference.

TECHNICAL FIELD

The present invention relates to a method for the manufacture of polyalkoxylated polymers.

BACKGROUND ART

Alkoxylated derivatives of fluorinated alcohols having a low alkoxylation degree, typically ranging from 2 to 10, and in particular ethoxylated derivatives of (per)fluoropolyether (PFPE) alcohols, are useful building blocks for the synthesis of further functional derivatives and mixed copolymers. Indeed, the presence of a short polyethyleneoxy chain at the polymer ends improves compatibility with hydrogenated reagents, which is particularly desirable in the synthesis of copolymers with hydrogenated blocks. Compatibility with hydrogenated compounds may also be an advantage in the manufacture of compositions wherein a PFPE alcohols is to be mixed with hydrogenated ingredients.

However, while ethoxylated derivatives of PFPEs alcohols having an ethoxylation degree from 1 to about 2 can be synthesised by reaction of a PFPE alcohol with ethylene oxide in the presence of a catalytic amount of the corresponding PFPE alkoxide, ethoxylated derivatives having an ethoxylation degree equal to or higher than 2 cannot.

In order to overcome this drawback, attempts to develop alternative methods have been made.

A number of prior art documents disclose the use of boron-based catalysts in the manufacture of ethoxylated derivatives of fluorinated alcohols (for example, in WO 95/35272 (DU PONT), WO 96/28407 (DU PONT), U.S. Pat. No. 8,039,677 (DU PONT), WO 2009/073641 (CHEMGUARD LTD), WO 2010/127230 (DU PONT) and WO 2012/139070 (E.I. DU PONT DE NEMOURS AND COMPANY)).

In particular, WO 2010/127230 (DU PONT) is directed to processes for the alkoxylation of alcohols using alkylene epoxides in the presence of boron based catalysts. In the description, it is mentioned that catalyst systems and processes for the alkoxylation of fluorinated alcohols previously known in the art, included using Lewis acids such as boron trifluoride or silicon tetrafluoride, alone in combination with metal hydrides, fluorides, alkyls or alkoxides. However, such acidic materials also catalysed side reactions such as dimerization of alkylene epoxides to form dioxanes during the alkylalkoxylation. For this reason, strongly basic catalysts to alkoxylate alcohols were proposed. However, some alcohols are not stable to strong base. Comparative Examples 1 and 2 showed that when (per)halogenated alcohols, such as $C_6F_{13}CH_2CH_2OH$, are treated with a strong base such as notably NaH and KOH, in order to generate an alkoxide ethoxylation catalyst, the reaction fails as the fluorinated alcohol is prone to elimination of fluoride and formation of olefin.

WO 2014/090649 (SOLVAY SPECIALTY POLYMERS ITALY S.P.A.) discloses a process comprising the following steps:
1) separately providing a mixture [M1], comprising a PFPE alcohol and a catalytic amount of the corresponding alkoxide (herein after "PFPE-alk");
2) bringing into contact mixture [M1] with a boric acid triester of the same PFPE alcohol (herein after "PFPE-triBor") in such an amount that the molar ratio PFPE-alk: PFPE-triBor is at least 1, to obtain a mixture [M2];
3) contacting mixture [M2] with a catalytic amount of an iodine source to obtain a mixture [M3];
4) treating mixture [M3] with an alkoxylating agent to provide a mixture [M4] containing an alkoxylated derivative of the PFPE alcohol.

In all the examples disclosed in this patent application, the purification step was necessarily performed in the presence of a base, notably 20% potassium carbonate aqueous solution, in order to provide the alkoxylated derivative of the PFPE alcohol.

Further catalysts useful for the alkoxylation of fluorinated alcohols have been disclosed in the art.

For example, U.S. Pat. No. 4,490,561 (CONOCO INC.) relates to a method for the alkoxylation of fluorinated alcohols which comprises contacting a fluorinated alcohol with an alkoxylating agent in the presence of a catalyst, at temperatures of from about 90° C. to about 260° C., wherein the catalyst is selected, among the others, from those having general formula

$$(R)_{q-v}MX_v \qquad (1)$$

wherein M is a metal selected from the group consisting of gallium, indium, thallium, zirconium, hafnium, aluminium and titanium;
v is from 1 to q−1,
q is the valence of M,
R is independently hydrogen, fluorine, alkyl groups, alkoxide groups containing from 1 to 20 carbon atoms, and
X is halogen.

Catalyst based on titanium and zirconium have been disclosed for example in U.S. Pat. No. 4,983,778 (HENKEL KOMMANDITGESELLSCHAFT AUF AKTIEN), which discloses a process for ethoxylation or propoxylation of compounds containing active H atoms, said process using esters of titanic and/or zirconic acid with monoalkanols containing 1 to 4 carbon atoms together with sulphuric acid and/or alkanesulfonic acids containing 1 to 6 carbon atoms and/or hydroxyarylsulfonic acids. Preferred catalysts are $Ti(OiC_3H_7)_4$ in combination with $H_2SO_4$, $HO-C_6H_4-SO_3H$, and $Zr(OiC_3H_7)_4$ in combination with $CH_3SO_3H$.

Further process for the preparation of different alkoxylate products, notably alkanol alkoxylate, has been disclosed in EP 0228121 A (SHELL INTERNATIONALE RESEARCH MAATSCHAPPIJ B.V.).

SUMMARY OF INVENTION

Recently, concerns about the toxicological profile of boric acid and derivatives thereof have been raised. As a consequence, the Applicant faced the problem to provide alternative catalysts that can be used in a convenient process for the alkoxylation of PFPE polymers and having better toxicological profiles when compared to boric acid and its derivatives.

Thus, in a first aspect, the present invention relates to a process for the manufacture of alkoxylated derivatives of hydrogenated or (per)halogenated polymers comprising at least one —OH group [polymer ($P_{ALK-OH}$)], said process comprising the steps of:

(a) contacting at least one pre-catalyst [pre-catalyst C] complying with the following formula (1):

$$E(Q)_t \quad (1)$$

wherein

E is an element selected from IV-group metals, post-transition metals and silicon, Q is chlorine, bromine, iodine or an alkoxy or aryloxy group, and t is an integer corresponding to the valence of E;

with (a-i) at least one hydrogenated or (per)halogenated polymer comprising at least one —OH group [polymer ($P_{OH}$)], thus providing a mixture [mixture ($M_{a-1}$)] comprising said polymer ($P_{OH}$) and a product [product (C—$P_{OH}$)] obtained by the reaction between said pre-catalyst C and said polymer ($P_{OH}$), or (a-ii) at least one source of iodine [compound I], thus providing a mixture [mixture ($M_{a-2}$)] comprising said pre-catalyst C and said compound (I);

(b) contacting said mixture ($M_{a-1}$) with at least one source of iodine [compound I] or contacting said mixture ($M_{a-2}$) with at least one polymer ($P_{OH}$) as defined above, thus obtaining mixture ($M_b$) comprising said polymer ($P_{OH}$), said product (C—$P_{OH}$) and said compound (I);

(c) contacting said mixture ($M_b$) with at least one alkylene oxide, thus obtaining polymer ($P_{ALK-OH}$), optionally in admixture [mixture ($M_c$)] with said polymer ($P_{OH}$), said product (C—$P_{OH}$) and/or said compound (I).

The Applicant has surprisingly found that pre-catalyst C works in the presence of several alkylene oxide sources, such that it is possible to provide polymers ($P_{ALK-OH}$) comprising recurring units derived from different alkoxylated groups, within the same reaction environment.

In addition, the Applicant found that the process according to the present invention can be used for the alkoxylation of both hydrogenated and (per)halogenated polymers that comprise group(s) that undergo(es) to degradation when contacted with a strong base, such as notably NaH, KOH and the like.

Advantageously, the Applicant found that the process according to the present invention provides polymer ($P_{ALK-OH}$) with high yields.

Without being bound by any theory, the Applicant believes that when the pre-catalyst C as defined above is contacted with polymer $P_{OH}$, an esterification reaction occurs that results in a product [product (C—$P_{OH}$)] between said element E of pre-catalyst C and said at least one —OH group of polymer P. Said product (C—$P_{OH}$) is deemed to act as catalytic species in the subsequent alkoxylation reaction of polymer $P_{OH}$ (i.e., in step c). The esterification reaction, i.e. step (a-i) proceeds with the elimination of group Q of pre-catalyst C, which is removed from the reaction environment in form of compound of formula HQ.

Thus, in a second aspect, the present invention relates to a product [product (C—$P_{OH}$)] obtained by the reaction between element E of pre-catalyst C and the at least one —OH group of polymer $P_{OH}$.

In addition, in a third aspect the present invention relates to a mixture [mixture ($M_c$)] comprising polymer ($P_{ALK-OH}$), polymer ($P_{OH}$) and optionally product (C—$P_{OH}$) and/or said compound (I).

DESCRIPTION OF EMBODIMENTS

For the purpose of the present description and of the following claims:

the use of parentheses around symbols or numbers identifying the formulae, for example in expressions like "polymer (P)", etc., has the mere purpose of better distinguishing the symbol or number from the rest of the text and, hence, said parenthesis can also be omitted;

the acronym "PFPE" stands for "(per)fluoropolyether" and, when used as substantive, is intended to mean either the singular or the plural form, depending on the context;

the term "(per)fluoropolyether" is intended to indicate fully or partially fluorinated polyether polymer;

the term "pre-catalyst" is intended to indicate a compound that is converted into a catalytic species during the course of the catalyzed reaction;

then expression "catalytic species" is used as synonym of "catalyst".

Preferably, E is an element selected in the group comprising, more preferably consisting of, IV-group metals selected from the group comprising, more preferably consisting of, titanium and zirconium; post-transitional metals, selected from the group comprising, more preferably consisting of, gallium, indium, tin and aluminium; and silicon.

Preferably, Q is an optionally fluorinated alkoxy or aryloxy group. More preferably Q complies with formula —O-T, wherein T is a linear or branched alkyl chain having from 1 to 12 carbon atoms, said alkyl chain being optionally substituted with one or more fluorine atoms, or a 5- or 6-membered optionally fluorinated aryl group. Even more preferably, Q is a group of formula —O-T wherein T is a linear or branched alkyl chain having 1 to 6 carbon atoms or —$C_6H_5$.

Even more preferably, said pre-catalyst C is selected in the group comprising: titanium(IV) isopropoxide, titanium (IV) propoxide, titanium(IV) tert-butoxide, titanium(IV) methoxide, zirconium(IV) propoxide, aluminium isopropoxide, tin(IV) isopropoxide, tetraethyl orthosilicate, indium alkoxide and gallium alkoxide.

Titanium(IV) isopropoxide, titanium(IV) propoxide, titanium(IV) tert-butoxide, titanium(IV) methoxide and zirconium(IV) propoxide are particularly preferred.

Preferably, pre-catalyst C is used in a catalytic amount, more preferably in the range from 0.01 to 10%, more preferably from 0.1 to 5%, expressed as moles of pre-catalyst C per number of equivalents of —OH groups in polymer ($P_{OH}$).

Compound (I) is preferably selected in the group comprising: alkali metal or alkaline-earth metal iodides, such as for example NaI, KI, $CaI_2$; ammonium and alkyl-ammonium iodides, such as $NH_4I$ and $(R)_4NI$ wherein each R is a linear or branched alkyl chain comprising from 1 to 6 carbon atoms; elemental iodine; and combinations thereof. Good results have been obtained using KI.

Compound (I) is advantageously used in a catalytic amount. Preferably, compound (I) is used in an amount in the range from 0.01 to 8%, more preferably from 0.5 to 2.5%, expressed as moles of the source of iodine per number of equivalents of —OH groups in polymer ($P_{OH}$).

Preferably, said hydrogenated polymers ($P_{OH}$) used as starting materials are selected polymers of formula $R_H$—OH, wherein $R_H$ is a linear or branched alkyl chain comprising from 3 to 12 carbon atoms.

Preferably, said (per)halogenated polymers ($P_{OH}$) used as starting materials are selected from:
- polymers complying with general formula $R_{FH}$—$CF_2CH_2CH_2OH$ wherein $R_{FH}$ is a linear or branched alkyl chain comprising from 1 to 12 carbon atoms, and
- (per)fluoropolyether polymer [polymer ($P_{OH\text{-}PFPE}$)] comprising a partially or fully fluorinated, straight or branched, polyoxyalkylene chain [chain ($R_f$)] having at least two chain ends, wherein at least one chain end comprises at least one group of formula —$CF_2CH_2O$— and at least one hydroxy group.

Preferably, said polymer ($P_{OH\text{-}PFPE}$) complies with the following formula (I):

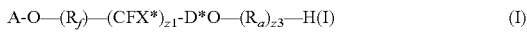

$$A\text{—}O\text{—}(R_f)\text{—}(CFX^*)_{z1}\text{-}D^*O\text{—}(R_a)_{z3}\text{—}H(I) \qquad (I)$$

wherein

A is linear or branched (per)fluoroalkyl chain comprising from 1 to 6 carbon atoms or a group of formula H—$(R_a)_{z4}$—O-D$(CFX^{\#})_{z2}$—;

z1 and z2, equal or different from each other, are equal to or higher than 1;

z3 and z4, equal or different from each other, are 0 or 1;

each of ($R_a$), equal or different from each other, is a group of formula —$[CH_2CH(J)O]_{na}[CH(J)CH_2O]_{na'}$—, wherein each of J is independently selected from hydrogen atom, straight or branched alkyl chain, or aryl group, and each of na and na' is independently zero or an integer up to 15, with the proviso that na+na' is from 1 to 15;

$X^{\#}$ and $X^*$, equal or different from each other, are —F or —$CF_3$, provided that when z1 and/or z2 are higher than 1, $X^{\#}$ and $X^*$ are —F;

D and D*, equal or different from each other, are an alkylene chain comprising from 1 to 6 and even more preferably from 1 to 3 carbon atoms, said alkyl chain being optionally substituted with at least one perfluoroalkyl group comprising from 1 to 3 carbon atoms;

($R_f$) comprises, preferably consists of, repeating units R°, said repeating units being independently selected from the group consisting of:
(i) —CFXO—, wherein X is F or $CF_3$;
(ii) —CFXCFXO—, wherein X, equal or different at each occurrence, is F or $CF_3$, with the proviso that at least one of X is —F;
(iii) —$CF_2CF_2CW_2O$—, wherein each of W, equal or different from each other, are F, Cl, H;
(iv) —$CF_2CF_2CF_2CF_2O$—;
(v) —$(CF_2)_j$—CFZ—O— wherein j is an integer from 0 to 3 and Z is a group of general formula —O—$R_{(f\text{-}a)}$-T, wherein $R_{(f\text{-}a)}$ is a fluoropolyoxyalkene chain comprising a number of repeating units from 0 to 10, said recurring units being chosen among the following: —CFXO—, —$CF_2CFXO$—, —$CF_2CF_2CF_2O$—, —$CF_2CF_2CF_2CF_2O$—, with each of X being independently F or $CF_3$ and T being a $C_1$-$C_3$ perfluoroalkyl group.

Preferably, said linear or branched (per)fluoroalkyl chain comprising from 1 to 6 carbon atoms is selected from —$CF_3$, —$C_2F_5$, —$C_3F_7$, —$CF_2Cl$, —$CF_2CF_2Cl$ and —$C_3F_6Cl$.

Preferably, z1 and z2, equal or different from each other, are from 1 to 10, more preferably from 1 to 6 and even more preferably from 1 to 3.

Preferably, J is hydrogen atom, methyl, ethyl or phenyl.

Preferably, each of na and na' is zero or an integer from 1 to 12, more preferably from 2 to 12, even more preferably from 2 to 10.

More preferably, each ($R_a$) comprises ethoxylated and/or propoxylated recurring unit(s). Even more preferably each ($R_a$) complies with one of the following formulae ($R_a$-I) to ($R_a$-III):

$$\text{—}(CH_2CH_2O)_{j1}\text{—} \qquad (R_a\text{-I})$$

$$\text{—}[CH_2CH(CH_3)O]_{j2}\text{—} \qquad (R_a\text{-II})$$

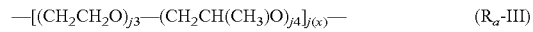

$$\text{—}[(CH_2CH_2O)_{j3}\text{—}(CH_2CH(CH_3)O)_{j4}]_{j(x)}\text{—} \qquad (R_a\text{-III})$$

wherein j1 and j2, each independently, are an integer from 1 to 15, preferably from 2 to 15, more preferably from 3 to 15, even more preferably from 4 to 15, and still more preferably from 4 to 10;

j3, j4 and j(x) are integers higher than 1, such that the sum of j3 and j4 is from 2 to 15, more preferably from 3 to 15, even more preferably from 4 to 15, and still more preferably from 4 to 10.

More preferably, D and D*, equal or different from each other, are a chain of formula —$CH_2$— or —$CH(CF_3)$—.

Preferably, chain ($R_f$) complies with the following formula:

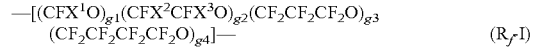

$$\text{—}[(CFX^1O)_{g1}(CFX^2CFX^3O)_{g2}(CF_2CF_2CF_2O)_{g3}(CF_2CF_2CF_2CF_2O)_{g4}]\text{—} \qquad (R_f\text{-I})$$

wherein $X^1$ is independently selected from —F and —$CF_3$, $X^2$, $X^3$, equal or different from each other and at each occurrence, are independently —F, —$CF_3$, with the proviso that at least one of X is —F;

g1, g2, g3, and g4, equal or different from each other, are independently integers ≥0, such that g1+g2+g3+g4 is in the range from 2 to 300, preferably from 2 to 100; should at least two of g1, g2, g3 and g4 be different from zero, the different recurring units are generally statistically distributed along the chain.

More preferably, chain ($R_f$) is selected from chains of formula:

$$\text{—}[(CF_2CF_2O)_{a1}(CF_2O)_{a2}]\text{—} \qquad (R_f\text{-IIA})$$

wherein:

a1 and a2 are independently integers ≥0 such that the number average molecular weight is between 400 and 10,000, preferably between 400 and 5,000; both a1 and a2 are preferably different from zero, with the ratio a1/a2 being preferably comprised between 0.1 and 10;

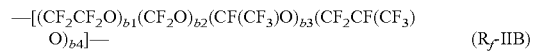

$$\text{—}[(CF_2CF_2O)_{b1}(CF_2O)_{b2}(CF(CF_3)O)_{b3}(CF_2CF(CF_3)O)_{b4}]\text{—} \qquad (R_f\text{-IIB})$$

wherein:

b1, b2, b3, b4, are independently integers ≥0 such that the number average molecular weight is between 400 and 10,000, preferably between 400 and 5,000; preferably b1 is 0, b2, b3, b4 are >0, with the ratio b4/(b2+b3) being ≥1;

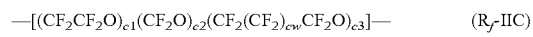

$$\text{—}[(CF_2CF_2O)_{c1}(CF_2O)_{c2}(CF_2(CF_2)_{cw}CF_2O)_{c3}]\text{—} \qquad (R_f\text{-IIC})$$

wherein:

cw=1 or 2;

c1, c2, and c3 are independently integers ≥0 chosen so that the number average molecular weight is between 400 and 10,000, preferably between 400 and 5,000; preferably c1, c2 and c3 are all >0, with the ratio c3/(c1+c2) being generally lower than 0.2;

$$\text{—}[(CF_2CF(CF_3)O)_d]\text{—} \qquad (R_f\text{-IID})$$

wherein:

d is an integer >0 such that the number average molecular weight is between 400 and 10,000, preferably between 400 and 5,000;

$$—[(CF_2CF_2C(Hal^*)_2O)_{e1}—(CF_2CF_2CH_2O)_{e2}—(CF_2CF_2CH(Hal^*)O)_{e3}]— \quad (R_f\text{-IIE})$$

wherein:

Hal*, equal or different at each occurrence, is a halogen selected from fluorine and chlorine atoms, preferably a fluorine atom;

e1, e2, and e3, equal to or different from each other, are independently integers ≥0 such that the (e1+e2+e3) sum is comprised between 2 and 300.

Still more preferably, chain ($R_f$) complies with formula ($R_f$-III) here below:

$$—[(CF_2CF_2O)_{a1}(CF_2O)_{a2}]— \quad (R_f\text{-III})$$

wherein:

a1, and a2 are integers >0 such that the number average molecular weight is between 400 and 10,000, preferably between 400 and 5,000, with the ratio a1/a2 being generally comprised between 0.1 and 10, more preferably between 0.2 and 5.

When in polymer $P_{OH\text{-}PFPE}$, one chain end bears one hydroxyl group and one chain end bears a neutral group selected from $—CF_3$, $—C_2F_5$, $—C_3F_7$, $—CF_2Cl$, $—CF_2CF_2Cl$ and $—C_3F_6Cl$, polymer $P_{OH\text{-}PFPE}$ is also referred to as "monofunctional PFPE alcohol".

When in polymer $P_{OH\text{-}PFPE}$, both chain ends bear one hydroxyl group, polymer $P_{OH\text{-}PFPE}$ is also referred to as "bifunctional PFPE alcohol" and "PFPE-diol".

More preferably, polymer $P_{OH\text{-}PFPE}$ complies with formula (I-A) here below:

$$A\text{-}O—(R_f)—CF_2CH_2O—(R_a)_{z3}—H \quad (I\text{-}A)$$

wherein:

$R_f$ is as defined above and preferably complies with formula ($R_f$-III) above;

A is selected from $—CF_3$, $—C_2F_5$, $—C_3F_7$, $—CF_2Cl$, $—CF_2CF_2Cl$, $—C_3F_6Cl$ or a group of formula $—CF_2CH_2O—(R_a)_{z4}—H$;

z3 and z4, equal or different from each other, are 0 or 1;

each of ($R_a$), equal or different from each other, is a group of formula $—[CH_2CH(J)O]_{na}[CH(J)CH_2O]_{na'}—$, wherein each of J is independently selected from hydrogen atom or methyl, and each of na and na' is independently zero or an integer up to 7, with the proviso that na+na' is from 1 to 7.

Even more preferably, each of na and na' is independently zero or an integer up to 3, with the proviso that na+na' is from 1 to 3.

Bi-functional polymers ($P_{OH\text{-}PFPE}$) wherein A is a group of formula $CF_2CH_2O—(R_a)_{z4}—H$ wherein ($R_a$) and z4 are as defined above are particularly preferred.

Preferred polymers $P_{OH\text{-}PFPE}$ according to formula (I) or formula (I-A) above can be manufactured by chemical reduction of corresponding PFPE carboxylic acids or esters according to several methods known in the art, using reducing agents such as $NaBH_4$, or by catalytic hydrogenation, as disclosed, for example, in U.S. Pat. No. 6,509,509 (AUSIMONT S.P.A.) 5 Jul. 2001, U.S. Pat. No. 6,573,411 (AUSIMONT SPA) 21 Nov. 2002, WO 2008/122639 (SOLVAY SOLEXIS SPA) 16 Oct. 2008. Precursors of PFPE carboxylic acids or of PFPE esters can be manufactured according to different methods, e.g. by oxypolymerization of fluoroolefins or by ring opening polymerization of HFPO (hexafluoropropylene oxide), as taught in U.S. Pat. No. 3,847,978 (MONTEDISON SPA) 12 Nov. 1974, U.S. Pat. No. 3,766,251 (MONTEDISON SPA) 16 Oct. 1973, U.S. Pat. No. 3,715,378 (MONTEDISON SPA) 6 Feb. 1973, U.S. Pat. No. 3,665,041 (MONTEDISON SPA) 23 May 1972, U.S. Pat. No. 4,647,413 (MINNESOTA MINING & MFG) 3 Mar. 1987, EP 151877 A (MINNESOTA MINING & MFG) 21 Aug. 1985, U.S. Pat. No. 3,442,942 (MONTEDISON SPA) 6 May 1969, U.S. Pat. No. 577,291 (AUSIMONT SPA) 7 Jul. 1998, U.S. Pat. No. 5,258,110 (AUSIMONT SRL) 2 Nov. 1993 or U.S. Pat. No. 7,132,574 B (SOLVAY SOLEXIS SPA) 7 Nov. 2006.

For example, suitable polymers useful as starting material in the process according to the present invention are commercially available from Solvay Specialty Polymers Italy S.p.A. under the trade name Fluorolink®.

Preferably, step (a-i) is performed under heating, for example at a temperature from about 50° C. to about 150° C.

Preferably, step (a-i) is performed under vacuum.

According to one embodiment, when said polymer ($P_{OH\text{-}PFPE}$) complies with the following formula (I-B):

$$A\text{-}O—(R_f)—CF_2CH_2—OH \quad (I\text{-}B)$$

wherein $R_f$ is as defined above and

A is $—CF_2CH_2—OH$ or a linear or branched (per)fluoroalkyl chain comprising from 1 to 6 carbon atoms, before said step (a-i), a step (a-i-0) is performed which comprises contacting polymer ($P_{OH\text{-}PFPE}$) of formula (I-B) with a base, thus providing the corresponding alkoxide of polymer ($P_{OH\text{-}PFPE}$).

As a consequence, according to this embodiment, step (a-i) comprises contacting said pre-catalyst C with the alkoxide of polymer ($P_{OH\text{-}PFPE}$) of formula(I-B)

Preferably, said base is selected from NaH, NaOH, KOH.

Preferably, said base is used in a sub-stoichiometric amount compared to polymer ($P_{OH\text{-}PFPE}$)

Preferably, the ratio between the base and the pre-catalyst C is higher than 1, more preferably between 1 and 2.

Product (C—$P_{OH}$) complies with the following formula (II-A) or (II-B):

$$A^{II}\text{-}O—(R_f)—(CFX^*)_{z1}\text{-}D^*\text{-}O—(R_a)_{z3}\text{-}E(Z)_n \quad (II\text{-}A)$$

$$A^I\text{-}O—(R_f)—CF_2CH_2—O\text{-}E(Z)_n \quad (II\text{-}B)$$

wherein

Rf, X*, D*, ($R_a$), z1 and z3 are as defined above for polymer $P_{OH}$;

$A^{II}$ is a linear or branched (per)fluoroalkyl chain comprising from 1 to 6 carbon atoms as defined above for A or it is a group of formula $(Z)_nE\text{-}(R_a)_{z4}—O\text{-}D\text{-}(CFX^\#)_{z2}—$ wherein $X^\#$, D, ($R_a$), z2 and z4 are as defined above for polymer $P_{OH}$;

$A^I$ is a linear or branched (per)fluoroalkyl chain comprising from 1 to 6 carbon atoms as defined above for A or it is a group of formula $(Z)_nE\text{-}(R_a)_{z4}—O—CH_2CF_2—$ wherein ($R_a$) and z4 are as defined above for polymer $P_{OH}$;

E is as defined above for pre-catalyst C;

n is an integer corresponding to the valence of E; and

Z independently is group Q as defined above for pre-catalyst C or a group deriving from the reaction with another polymer ($P_{OH\text{-}PFPE}$), i.e. a group of formula (Z-I) or (Z-II):

$$A^{II}\text{-}O—(R_f)—(CFX^*)_{z1}\text{-}D^*\text{-}O—(R_a)_{z3}— \quad (Z\text{-}I)$$

$$A_I\text{-}O—(R_f)—CF_2CH_2—O— \quad (Z\text{-}II)$$

wherein $A_I$, $A^{II}$, Rf, X*, D*, ($R_a$), z1 and z3 are as defined above.

Preferably, Z is a group of formula (Z-I) in formula (II-A) and a group of formula (Z-II) in formula (II-B).

Preferably, step (a-ii) is performed at room temperature of under heating, for example at a temperature from about 50° C. to about 150° C.

Preferably, step (a-ii) is performed under vacuum.

Preferably, step (b) is performed by mixing together mixture ($M_{a-1}$) obtained in step (a-i) and said compound (I) or by mixing together mixture ($M_{a-2}$) obtained in step (a-ii) and said polymer ($P_{OH}$).

Preferably, said at least one alkylene oxide is selected from those of formula (III) below:

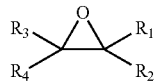
(III)

wherein R1, R2, R3 and R4, identical or different each other, are selected from hydrogen, straight or branched alkyl chain comprising from 1 to 4 carbon atoms.

Preferably, said alkylene oxide is selected from ethylene oxide, propylene oxide, butylene oxide and mixtures thereof.

According to an embodiment, step (c) is performed once by feeding one alkylene oxide.

According to an alternative embodiment, step (c) is performed by feeding two or more alkylene oxides having different formula within the same process.

In this case, step (c) can comprise the following steps:
(c-i) feeding two or more alkylene oxides at the same time, i.e. at least a first alkylene oxide and a second alkylene oxide having a chemical formula different from the first alkylene oxide are fed at the same time to the reaction environment of step (c-i), thus obtaining polymer ($P_{ALK-OH}$) comprising randomly arranged recurring units deriving at least from said first and second alkylene oxide;
(c-ii) feeding a first alkylene oxide, finishing/stopping the feeding of the first alkylene oxide, feeding a second alkylene oxide having a chemical formula different from the first alkylene, finishing/stopping the feeding of the second alkylene oxide, optionally feeding a third alkylene oxide having a chemical formula different from the second alkylene oxide and repeating said steps until completion of the reaction, thus obtaining polymer ($P_{ALK-OH}$) comprising recurring units deriving at least from said first and second alkylene oxide arranged in blocks.

Preferably, the amount of the alkylene oxide(s) to be fed in step (c) can be easily calculated depending on the final alkoxylation degree desired in the final polymer ($P_{ALK-OH}$) and on the equivalent number of —OH groups in the starting polymer ($P_{OH}$).

Preferably, step (c) is performed by monitoring the consumption of the alkylene oxide(s) and/or the formation of the alkoxylated polymer. Typically, the reaction is monitored by checking the pressure of the alkylene oxide(s) within the reactor wherein step (c) is performed.

When ethylene oxide is used as the alkylene oxide, step (c) is preferably carried out by maintaining a pressure of from about 0.1 to 6 atm, preferably from about 1 to 5 atm.

According to a preferred embodiment, polymer ($P_{ALK-OH}$) complies with the following formula (IV)

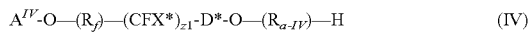
(IV)

wherein
Rf, X*, D*, ($R_a$) and z1 are as defined above for polymer $P_{OH}$;
$A^{IV}$ is a linear or branched (per)fluoroalkyl chain comprising from 1 to 6 carbon atoms or a group of formula H—($R_{a-IV*}$)—O-D-($CFX^{\#}$)$_{z2}$— wherein ($R_a$), and z2 are as defined above for polymer $P_{OH}$, and each of ($R_{a-IV}$) and ($R_{a-IV*}$) is independently selected from group of formula —[$CH_2CH(J)O]_{na*}$[$CH(J)CH_2O]_{na\#}$—, wherein each of J is independently hydrogen atom or methyl, and each of na* and na# is independently zero or an integer from 1 to 100, with the proviso that at least one of na* and na# is in integer having a value higher than the value of na and na', respectively, in polymer ($P_{OH}$).

More preferably, each of ($R_{a-IV}$) and ($R_{a-IV*}$) is independently selected from ethoxylated, propoxylated, butoxylated recurring units. Even more preferably, each of ($R_{a-IV}$) and ($R_{a-IV*}$) complies with one of the following formulae ($R_a$-I) to ($R_a$-III):

($R_a$-I)

($R_a$-II)

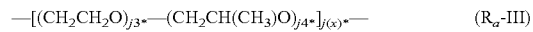
($R_a$-III)

wherein j1*, j2*, j3*, j4* and j(x)*, each independently, is an integer higher than 2, even more preferably from 2 to 100, such that the value of each of j1*, j2*, j3*, j4* and j(x)* is higher than the value of—respectively—j1, j2, j3, j4 and j(x) in starting polymer ($P_{OH}$).

According to a preferred embodiment, both ($R_{a-IV}$) and ($R_{a-IV*}$) are recurring units of formula ($R_a$-I) above.

According to another preferred embodiment, ($R_{a-IV}$) and ($R_{a-IV*}$) each independently comprise randomly arranged recurring units complying with at least two of formulae ($R_a$-I), ($R_a$-II) and ($R_a$-III).

According to still another embodiment, ($R_{a-IV}$) and ($R_{a-IV*}$) each independently comprise blocks of recurring units complying with at least two of formulae ($R_a$-I), ($R_a$-II) and ($R_a$-III).

Polymer ($P_{ALK-OH}$) is obtained at the end of step (c).

Preferably, steps (a), (b) and (c) are performed under conditions such that the conversion rate of polymer ($P_{OH}$) into polymer ($P_{ALK-OH}$) is of at least 90%, more preferably at least 95% and even more preferably at least 97%.

According to a preferred embodiment of the process according to the present invention, at the end of step (c), polymer ($P_{ALK-OH}$) is obtained with a conversion rate higher than 98%, i.e. at least 98% of the starting polymer ($P_{OH}$) is transformed into polymer ($P_{ALK-OH}$).

However, embodiments wherein polymer ($P_{ALK-OH}$) is obtained with a conversion rate of less than 99% are also encompassed by the present invention.

According to this embodiment, polymer ($P_{ALK-OH}$) is obtained at the end of step (c) in admixture with unreacted polymer ($P_{OH}$), and optionally with un-reacted product (C—$P_{OH}$) and/or unreacted compound (I).

Accordingly, mixture ($M_c$) comprises at least 90% by weight, preferably at least 95% by weight and more preferably at least 97% by weight of polymer ($P_{ALK-OH}$) based on the total weight of said mixture ($M_c$), the remaining percent by weight to 100% comprising unreacted polymer ($P_{OH}$) and optionally un-reacted product (C—$P_{OH}$) and/or unreacted compound (I).

Preferably after step (c), step (d) of contacting said mixture ($M_c$) with a solvent in order to extract or purify polymer ($P_{ALK-OH}$) is performed.

Preferably, said solvent is water or a water-alcohol mixture, preferably a mixture between water and an alcohol selected from ethanol, i-propanol and i-butanol, wherein the alcohol is in an amount of less than 10 wt. % based on the total weight of the water-alcohol mixture.

Thus, the process according to the present invention provides the great advantage that the final polymer ($P_{ALK-OH}$) is easily recovered using a solvent free from the traditional organic solvents used in the processes known from the prior art. The use of water or of the water-alcohol mixture provides for environmental advantages in terms of reduction of organic solvents and wastewaters.

Preferably, after step (d), step (e) of separating the aqueous layer and the organic layer comprising the final polymer ($P_{ALK-OH}$) is performed according to methods known in the art.

Preferably, after step (e), step (f) of filtering the organic layer obtained from step (e) is performed.

Should the disclosure of any patents, patent applications, and publications which are incorporated herein by reference conflict with the description of the present application to the extent that it may render a term unclear, the present description shall take precedence.

The invention will be illustrated in greater detail in the experimental section and non-limiting examples reported below.

EXPERIMENTAL PART

Materials and Methods

The following were obtained from Solvay Specialty Polymers Italy S.p.A.:
Fluorolink® E10H PFPE [PFPE-1] of formula HO(CH2CH2O)$_p$CH$_2$CF$_2$O(CF$_2$CF$_2$O)$_n$(CF$_2$O)$_m$ CF$_2$CH$_2$O(CH2CH2O)$_p$H having m/n=1.2, p=1.79, average molecular weight $M_n$=1.765 and equivalent weight Ew=962;
bi-functional PFPE diol [PFPE-2] of formula HOCH$_2$CF$_2$O(CF$_2$CF$_2$O)$_n$(CF$_2$O)$_m$CF$_2$CH$_2$OH having m/n=1.2, average molecular weight $M_n$=1.550 and equivalent weight Ew=861

The other reagents and solvents were purchased from Sigma-Aldrich and used as received.

$^1$H-NMR, $^{13}$C-NMR and $^{19}$F-NMR spectra were recorded on a Agilent System 500 operating at 499.86 MHz for $^1$H, 125.70 MHz for $^{12}$C and 470.30 MHz for $^{19}$F.

Inductively Coupled Plasma (ICP) analyses were carried out with a Perkin Elmer ICP-OES spectrometer, model Optima 4300 DV.

Example 1

Step 1—Synthesis of Ethoxylated PFPE Diol 2.9 kg of PFPE-1 were charged in 2 L-reactor, equipped with a mechanical stirrer, a mechanical vacuum pump and a cold trap before the pump.

16.65 g (58.6 mmoles) of titanium(IV) propoxide was added and the resulting mixture was stirred and heated at 100° C. with an oil bath, then vacuum was applied to the reactor, keeping the pressure at about 10 mbar; all solids in the mixture disappeared and a clear solution was obtained (about 1 hour). The amount of normal propyl alcohol in the cold trap was consistent with that expected by the reaction of titanium(IV) propoxide with PFPE-1 to form the corresponding titanium ester (about 14 grams).

The obtained solution was charged into a 10 L reactor and 10.5 g dried potassium iodide were added. The resulting mixture was heated at 100° C. under stirring and stripped with a nitrogen flow to remove water traces. The temperature was raised to 140° C. and the reactor evacuated.

Ethylene oxide (EO) was fed in the reactor up to a pressure of 3.5 atm and consumption of EO was readily observed by the pressure decrease. EO was continuously fed in order to maintain the pressure between 3 and 3.5 atm.

After 1.5 hours about 368.5 g EO were fed. EO feeding was stopped and within 50 minutes the pressure inside the reactor decreased from 3.5 atm down to 1 atm. The reaction mixture was cooled, stripped with nitrogen to eliminate dissolved residual EO and about 3,250 g of the product were recovered.

Step 2—Purification and Analysis of the Ethoxylated PFPE Diol 100 g of the product obtained in Step 1 were fed on a water solution of isobutylic alcohol (8% w/w) and vigorously stirred at reflux temperature 1 hour. The lower organic layer was collected and submitted to distillation in order to remove the solvents (water, isobutanol).

The solid product was filtered by using a 0.45 μm PTFE membrane in order to remove precipitated titanium dioxide and the residue that consisted of 97 g of a clear pale yellow liquid was submitted to NMR analyses.

$^1$H-NMR (solution in A113/CD$_3$OD) and $^{19}$F-NMR analyses confirmed the following structure:

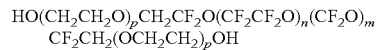

with an average ethoxylation degree (p) of 4.6 and content of bi-functional PFPE-1 of about 0.3% (conversion exceeding 99%).

$^{13}$C-NMR spectroscopy confirmed the ethoxylation degree value obtained by $^1$H-NMR.

Inductively Coupled Plasma (ICP) analysis revealed a negligible content of titanium (5 ppm).

Example 2

Step 1—Synthesis of Ethoxylated PFPE Diol 3.8 kg of PFPE-2 were charged in 10 L-reactor and added with 60.0 g of a 30% aqueous solution of KOH (325 mmoles of KOH). The mixture was stirred and heated at 80° C. under vacuum (from 50 mbar down to 10 mbar) till complete elimination of water.

The reactor was cooled down at 60° C. Then, 46.0 g of titanium(IV) propoxide (162 mmoles) were added and the mixture was stirred for half an hour under a slight nitrogen overpressure (0.2 bar). Then vacuum was applied to the reactor and temperature was raised again at 80° C. until complete elimination of the propyl alcohol.

17.2 g of KI dispersed in slurry with 200 g of the starting PFPE were added to the mixture and the reactor was stripped with a nitrogen flow for 15 minutes.

Temperature was raised to about 110° C. and the reactor evacuated. EO was fed up to a pressure of 3.4 atm (about 270 g) and a consumption of the ethylene oxide was readily observed by the pressure decrease. EO was continuously fed in order to maintain pressure between 3 and 3.5 atm, using an automatic pressure control.

After 1.5 hours about 310 g of EO (theoretical average ethoxylation degree p=1.69) were fed to the reactor, but then the consumption rate slowed down and after one hour no further feeding of EO was observed.

The temperature was then increased to 140° C. in about half an hour and consumption of EO was again observed. The consumption rate became faster and after about 6 hours, overall 613 g of EO (13.9 moles) (theoretical average ethoxylation degree p=3) had been fed to the reactor. The feeding was stopped and within 45 minutes the pressure inside the reactor decreased from 3.5 atm down to 1 atm. The reaction mixture was cooled, stripped with nitrogen to eliminate residual dissolved EO and about 4620 g of product were discharged from the reactor.

Step 2—Purification and Analysis of the Ethoxylated PFPE Diol

A portion of the polymer obtained in Step 1 above was treated according to the procedure of Example 1 in order to have it purified from the catalyst and analyzed.

The $^1$H-NMR (solution in A113/CD$_3$OD) and $^{19}$F-NMR analyses confirmed the following structure:

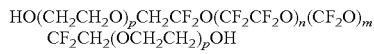

HO(CH$_2$CH$_2$O)$_p$CH$_2$CF$_2$O(CF$_2$CF$_2$O)$_n$(CF$_2$O)$_m$CF$_2$CH$_2$(OCH$_2$CH$_2$)$_p$OH with an average ethoxylation degree (p) of 3.1 and a content of residual ZDOL chain ends close to 1.0% (conversion 99%).

The invention claimed is:

1. A process for the manufacture of an alkoxylated derivative of a hydrogenated or (per)halogenated polymer comprising at least one —OH group [polymer (P$_{ALK-OH}$)], said process comprising the steps of:
   (a) contacting at least one pre-catalyst C complying with formula (1)

$$E(Q)_t \qquad (1)$$

wherein
   E is an element selected from IV-group metals, post-transition metals and silicon,
   Q is chlorine, bromine, iodine or an optionally fluorinated alkoxy or aryloxy group, and
   t is an integer corresponding to the valence of E;
   with
   (a-i) at least one polymer (P$_{OH}$), wherein polymer (P$_{OH}$) is a hydrogenated or (per)halogenated polymer comprising at least one —OH group,
   thus providing a mixture (M$_{a-1}$) comprising said polymer P$_{OH}$ and a product (C-P$_{OH}$) obtained by the reaction between said pre-catalyst C and said polymer (P$_{OH}$), or
   (a-ii) at least one compound (I), wherein compound (I) is a source of iodine, thus providing a mixture (M$_{a-2}$) comprising said pre-catalyst C and said compound (I);
   (b) contacting said mixture (M$_{a-1}$) with at least one compound (I), wherein compound (I) is a source of iodine or
   contacting said mixture (M$_{a-2}$) with at least one polymer (P$_{OH}$),
   thus obtaining mixture (M$_b$) comprising said polymer (P$_{OH}$), said product (C-P$_{OH}$) and said compound (I);
   (c) contacting said mixture (M$_b$) with at least one alkylene oxide,
   thus obtaining polymer (P$_{ALK-OH}$), optionally in admixture [mixture (M$_c$)] with said polymer (P$_{OH}$), said product (C-P$_{OH}$) and/or said compound (I).

2. The process according to claim 1, wherein E is an element selected from the group consisting of: IV-group metals selected from titanium and zirconium; post-transitional metals selected from gallium, indium, tin and aluminium; and silicon.

3. The process according to claim 1, wherein Q is an optionally fluorinated alkoxy or aryloxy group.

4. The process according to claim 1, wherein said pre-catalyst C is selected from the group consisting of: titanium (IV) isopropoxide, titanium(IV) propoxide, titanium(IV) tert-butoxide, titanium(IV) methoxide, zirconium(IV) propoxide, aluminium isopropoxide, tin(IV) isopropoxide, tetraethyl orthosilicate, indium alkoxide and gallium alkoxide.

5. The process according to claim 1, wherein said pre-catalyst C is used in an amount in the range from 0.01 to 10% expressed as moles of pre-catalyst C per number of equivalents of —OH groups in polymer (P$_{OH}$).

6. The process according to claim 1, wherein said compound (I) is selected from the group consisting of: alkali metal or alkaline-earth metal iodides; ammonium and alkyl-ammonium iodides; elemental iodine; and combinations thereof.

7. The process according to claim 1, wherein said compound (I) is used in an amount in the range from 0.01 to 8% expressed as moles of the source of iodine per number of equivalents of —OH groups in polymer (P$_{OH}$).

8. The process according to claim 1, wherein said hydrogenated polymer (P$_{OH}$) is selected from the group consisting of polymers of formula Rx-OH, wherein R$_H$ is a linear or branched alkyl chain comprising from 3 to 12 carbon atoms.

9. The process according to claim 1, wherein said (per) halogenated polymer (P$_{OH}$) is selected from the group consisting of:
   polymers complying with general formula R$_{FH}$—CF$_2$CH$_2$CH$_2$OH wherein R$_{FH}$ is a linear or branched alkyl chain comprising from 1 to 12 carbon atoms; and
   (per)fluoropolyether polymers (P$_{OH-PFPE}$) comprising a partially or fully fluorinated, straight or branched, polyoxyalkylene chain (R$_f$) having at least two chain ends, wherein at least one chain end comprises at least one group of formula —CF$_2$CH$_2$O— and at least one hydroxy group.

10. The process according to claim 9, wherein said polymer (P$_{OH-PFPE}$) complies with formula (I):

$$\text{A-O—(R}_f\text{)—(CFX*)}_{z1}\text{-D*-O—(R}_a\text{)}_{z3}\text{—H} \qquad (I)$$

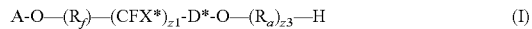

wherein
A is linear or branched (per)fluoroalkyl chain comprising from 1 to 6 carbon atoms or a group of formula H—(R$_a$)$_{z4}$—O-D-(CFX$^\#$)$_{z2}$;
z1 and z2, equal or different from each other, are equal to or higher than 1;
z3 and z4, equal or different from each other, are 0 or 1;
each of R$_a$, equal to or different from each other, is a group of formula —[CH$_2$CH(J)O]$_{na}$[CH(J)CH2O]$_{na'}$—, wherein each of J is independently selected from hydrogen atom, straight or branched alkyl chain, or aryl group, and each of na and na' is independently zero or an integer up to 15, with the proviso that na+na' is from 1 to 15; X$^\#$ and X*, equal or different from each other, are F or —CF$_3$,
provided that when z1 and/or z2 are higher than 1, X$^\#$ and X* are —F;
D and D*, equal or different from each other, are an alkylene chain comprising from 1 to 6 carbon atoms, said alkyl chain being optionally substituted with at least one perfluoroalkyl group comprising from 1 to 3 carbon atoms;

($R_f$) comprises repeating units $R°$, said repeating units being independently selected from the group consisting of:
(i) —CFXO—, wherein X is F or $CF_3$;
(ii) —CFXCFXO—, wherein X, equal or different at each occurrence, is F or $CF_3$, with the proviso that at least one of X is —F;
(iii) —$CF_2CF_2CW_2O$—, wherein each of W, equal or different from each other, are F, Cl, or H;
(iv) —$CF_2CF_2CF_2CF_2O$—;
(v) —$(CF2)_j$-CFZ—O— wherein j is an integer from 0 to 3 and Z is a group of general formula
—O—$R_{(f-a)}$-T, wherein $R_{(f-a)}$ is a fluoropolyoxyalkene chain comprising a number of repeating units from 0 to 10, said recurring units being chosen from: —CFXO—, —$CF_2CFXO$—, —$CF_2CF_2CF_2O$—, and —$CF_2CF_2CF_2CF_2O$—, with each of X being independently F or $CF_3$ and T being a $C_1$-$C_3$ perfluoroalkyl group.

11. The process according to claim 10, wherein said polymer ($P_{OH-PFPE}$) complies with formula (I-A) here below:

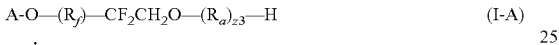
A-O—($R_f$)—$CF_2CH_2O$—($R_a$)$_{z3}$—H (I-A)

wherein:
$R_f$ comprises repeating units $R°$, said repeating units being independently selected from the group consisting of:
(i) —CFXO—, wherein X is F or $CF_3$;
(ii) —CFXCFXO—, wherein X, equal or different at each occurrence, is F or $CF_3$, with the proviso that at least one of X is —F;
(iii) —$CF_2CF_2CW_2O$—, wherein each of W, equal or different from each other, are F, Cl, or H;
(iv) —$CF_2CF_2CF_2CF_2O$—;
(v) —$(CF_2)_j$—CFZ—O— wherein j is an integer from 0 to 3 and Z is a group of general formula
—O—$R_{(f-a)}$-T, wherein $R_{(f-a)}$ is a fluoropolyoxyalkene chain comprising a number of repeating units from 0 to 10, said recurring units being chosen from: —CFXO—, —$CF_2CFXO$—, —$CF_2CF_2CF_2O$—, and —$CF_2CF_2CF_2CF_2O$—, with each of X being independently F or $CF_3$ and T being a $C_1$-$C_3$ perfluoroalkyl group;
A is —$CF_3$, —$C_2F_5$, —$C_3F_7$, —$CF_2Cl$, —$CF_2CF_2Cl$, —$C_3F_6Cl$ or a group of formula —$CF_2CH_2O$—($R_a$)$_{z4}$—H;
z3 and z4, equal or different from each other, are 0 or 1;
each of ($R_a$), equal or different from each other, is a group of formula
—[$CH_2CH(J)O$]$_{na}$[$CH(J)CH_2O$]$_{na'}$—, wherein each of J is independently hydrogen atom or methyl, and each of na and na' is independently zero or an integer from 1 to 7, with the proviso that na+na' is from 1 to 7.

12. The process according to claim 10, wherein said polymer ($P_{OH-PFPE}$) complies with formula (1-B):

A-O—($R_f$)—CF2$CH_2$—OH (1-B)

wherein
$R_f$ comprises repeating units $R°$, said repeating units being independently selected from the group consisting of:
(i) —CFXO—, wherein X is F or $CF_3$;
(ii) —CFXCFXO—, wherein X, equal or different at each occurrence, is F or $CF_3$, with the proviso that at least one of X is —F;
(iii) —$CF_2CF_2CW_2O$—, wherein each of W, equal or different from each other, are F, Cl, or H;
(iv) —$CF_2CF_2CF_2CF_2O$—;
(v) —$(CF_2)_j$—CFZ—O— wherein j is an integer from 0 to 3 and Z is a group of general formula
—O—$R_{(f-a)}$-T, wherein $R_{(f-a)}$ is a fluoropolyoxyalkene chain comprising a number of repeating units from 0 to 10, said recurring units being chosen from: —CFXO—, —$CF_2CFXO$—, —$CF_2CF_2CF_2O$—, and —$CF_2CF_2CF_2CF_2O$—, with each of X being independently F or $CF_3$ and T being a $C_1$-$C_3$ perfluoroalkyl group; and
A is —$CF_2CH_2$—OH or a linear or branched (per)fluoroalkyl chain comprising from 1 to 6 carbon atoms,
and wherein before said step (a-i), a step (a-i-0) is performed which comprises contacting polymer ($P_{OH-PFPE}$) of formula (1-B) with a base, thus providing the corresponding alkoxide of polymer ($P_{OH-PFPE}$).

13. The process according to claim 1, wherein said product (C-$P_{OH}$) complies with formula (II-A) or (II-B):

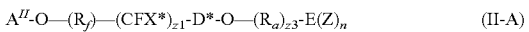
$A^{II}$-O—($R_f$)—(CFX*)$_{z1}$-D*-O—($R_a$)$_{z3}$-E(Z)$_n$ (II-A)

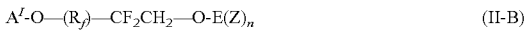
$A^I$-O—($R_f$)—$CF_2CH_2$—O-E(Z)$_n$ (II-B)

wherein
$R_f$ comprises repeating units $R°$, said repeating units being independently selected from the group consisting of:
(i) —CFXO—, wherein X is F or $CF_3$;
(ii) —CFXCFXO—, wherein X, equal or different at each occurrence, is F or $CF_3$, with the proviso that at least one of X is —F;
(iii) —$CF_2CF_2CW_2O$—, wherein each of W, equal or different from each other, are F, Cl, or H;
(iv) —$CF_2CF_2CF_2CF_2O$—;
(v) —$(CF_2)_j$—CFZ—O— wherein j is an integer from 0 to 3 and Z is a group of general formula
—O—$R_{(f-a)}$-T, wherein $R_{(f-a)}$ is a fluoropolyoxyalkene chain comprising a number of repeating units from 0 to 10, said recurring units being chosen from: —CFXO—, —$CF_2CFXO$—, —$CF_2CF_2CF_2O$—, and —$CF_2CF_2CF_2CF_2O$—, with each of X being independently F or $CF_3$ and T being a $C_1$-$C_3$ perfluoroalkyl group,
X* equal or different from $X^\#$, is —F or —$CF_3$, provided that when z1 and/or z2 are higher than 1, $X^\#$ and X* are —F,
D* equal or different from D, is an alkylene chain comprising from 1 to 6 carbon atoms, said alkyl chain being optionally substituted with at least one perfluoroalkyl group comprising from 1 to 3 carbon atoms,
each of ($R_a$) equal to or different from each other, is a group of formula —[$CH_2CH(J)O$]$_{na}$[$CH(J)CH_2O$]$_{na'}$—, wherein each of J is independently selected from hydrogen atom, straight or branched alkyl chain, or aryl group, and each of na and na' is independently zero or an integer up to 15, with the proviso that na+na' is from 1 to 15,
z1 is equal to or higher than 1, and
z3 is 0 or 1;
$A^{II}$ is a (per)fluoroalkyl chain comprising from 1 to 6 carbon atoms or it is a group of formula $(Z)_n$E-($R_a$)$_{z4}$—O-D-(CFX$^\#$)$_{z2}$—
wherein $X^\#$ equal or different from X*, is —F or —$CF_3$, provided that when z1 and/or z2 are higher than 1, $X^\#$ and X* are —F,
D equal or different from D*, is an alkylene chain comprising from 1 to 6 carbon atoms, said alkyl chain being optionally substituted with at least one perfluoroalkyl group comprising from 1 to 3 carbon atoms, each of ($R_a$) equal to or different from each other, is a group of formula —[$CH_2CH(J)O$]$_{na}$[$CH(J)CH_2O$]$_{na'}$—, wherein each of J is independently selected from hydrogen atom, straight or branched alkyl chain, or aryl group, and each of na and na' is independently zero or an integer up to 15, with the proviso that na+na' is from 1 to 15, z2 is equal to or higher than 1, and z4 is 0 or 1;

$A^I$ is a linear or branched (per)fluoroalkyl chain comprising from 1 to 6 carbon atoms or it is a group of formula $$(Z)_n\text{E-}(R_a)_{z4}\text{—O—}CH_2CF_2\text{—}$$

wherein each of ($R_a$) equal to or different from each other, is a group of formula —[$CH_2CH(J)O$]$_{na}$[$CH(J)CH_2O$]$_{na'}$—, wherein each of J is independently selected from hydrogen atom, straight or branched alkyl chain, or aryl group, and each of na and na' is independently zero or an integer up to 15, with the proviso that na+na' is from 1 to 15 and z4 is 0 or 1;

E is an element selected from the group consisting of IV-group metals selected from titanium and zirconium; post-transitional metals selected from gallium, indium, tin and aluminium; and silicon;

n is an integer corresponding to the valence of E; and

Z independently is an optionally fluorinated alkoxy or aryloxy group, a group derived from the reaction with another polymer ($P_{OH\text{-}PFPE}$), or a group of formula (Z-I) or (Z-II):

$$A^{II}\text{-O—}(R_f)\text{—}(CFX^*)_{z1}\text{-}D^*\text{-O—}(R_a)_{z3}\text{—} \quad (Z\text{-}I)$$

$$A^I\text{-O—}(R_f)\text{—}CF_2CH_2\text{—O—} \quad (Z\text{-}II).$$

14. The process according to claim 1, wherein said step (c) is performed as follows:

(c-i) by feeding two or more alkylene oxides at the same time to the reaction environment of step (c-i), thus obtaining polymer ($P_{ALK\text{-}OH}$) comprising randomly arranged recurring units derived at least from said first and second alkylene oxide, wherein the first alkylene oxide and the second alkylene oxide have different chemical formulas;

or (c-ii) by feeding a first alkylene oxide, finishing/stopping the feeding of the first alkylene oxide, feeding a second alkylene oxide having a chemical formula different from the first alkylene, finishing/stopping the feeding of the second alkylene oxide, optionally feeding a third alkylene oxide having a chemical formula different from the second alkylene oxide and repeating said steps until completion of the reaction, thus obtaining polymer ($P_{ALK\text{-}OH}$) comprising recurring units derived at least from said first and second alkylene oxide arranged in blocks.

15. The process according to claim 1, wherein said polymer ($P_{ALK\text{-}OH}$) complies with the following formula (IV):

$$A^{IV}\text{-O—}(R_f)\text{—}(CFX^*)_{z1}\text{-}D^*\text{-O—}(R_{a\text{-}IV})\text{—H} \quad (IV)$$

wherein z1 is equal to or higher than 1;

$X^*$ is —F or —$CF_3$, $D^*$ is an alkylene chain comprising from 1 to 6 carbon atoms, said alkyl chain being optionally substituted with at least one perfluoroalkyl group comprising from 1 to 3 carbon atoms;

($R_f$) comprises repeating units $R°$, said repeating units being independently selected from the group consisting of:

(i) —CFXO—, wherein X is F or $CF_3$;

(ii) —CFXCFXO—, wherein X, equal or different at each occurrence, is F or $CF_3$, with the proviso that at least one of X is —F;

(iii) —$CF_2CF_2CW_2O$—, wherein each of W, equal or different from each other, are F, Cl, or H;

(iv) —$CF_2CF_2CF_2CF_2O$—;

(v) —($CF_2$)$_j$—CFZ—O— wherein j is an integer from 0 to 3 and Z is a group of general formula —O—$R_{(f\text{-}a)}$-T, wherein $R_{(f\text{-}a)}$ is a fluoropolyoxyalkene chain comprising a number of repeating units from 0 to 10, said recurring units being chosen from: —CFXO—, —$CF_2$CFXO—, —$CF_2CF_2CF_2O$—, and —$CF_2CF_2CF_2CF_2O$—, with each of X being independently F or $CF_3$ and T being a $C_1$-$C_3$ perfluoroalkyl group;

$A^{IV}$ is a linear or branched (per)fluoroalkyl chain comprising from 1 to 6 carbon atoms or a group of formula H—($R_{a\text{-}IV^*}$)—O-D-(CFX$^\#$)$_{z2}$ wherein z2 is equal to or higher than 1 and $X^\#$ is —F or —$CF_3$, and D is an alkylene chain comprising from 1 to 6 carbon atoms, said alkyl chain being optionally substituted with at least one perfluoroalkyl group comprising from 1 to 3 carbon atoms; and each of ($R_{a\text{-}IV}$) and ($R_{a\text{-}IV^*}$) is independently selected from group of formula —[$CH_2CH(J)O$]$_{na^*}$[$CH(J)CH_2O$]$_{na\#}$—, wherein each of J is independently hydrogen atom or methyl, and each of na* and na# is independently zero or an integer from 1 to 100, with the proviso that at least one of na* and na# is in integer having a value higher than the value of na and na', respectively, in polymer ($P_{OH}$).

16. The process according to claim 3, wherein Q is an optionally fluorinated alkoxy or aryloxy group of formula —O-T, wherein T is a linear or branched alkyl chain having from 1 to 12 carbon atoms, said alkyl chain being optionally substituted with one or more fluorine atoms, or a 5- or 6-membered optionally fluorinated aryl group.

17. The process according to claim 10, wherein D and D*, equal or different from each other, are an alkylene chain comprising from 1 to 3 carbon atoms, said alkyl chain being optionally substituted with at least one perfluoroalkyl group comprising from 1 to 3 carbon atoms.

18. The process according to claim 15, wherein D and D*, equal or different from each other, are an alkylene chain comprising from 1 to 3 carbon atoms, said alkyl chain being optionally substituted with at least one perfluoroalkyl group comprising from 1 to 3 carbon atoms.

19. The method of claim 1, wherein Q is chlorine, bromine, iodine, an alkoxy or aryloxy group.

20. The method of claim 1, wherein the pre-Catalyst C consists of $E(Q)_t$.

* * * * *